2 Sheets—Sheet 1.
C. W. BALDWIN.
HYDRAULIC-ELEVATOR.
No. 7,019 Reissued March 28, 1876.
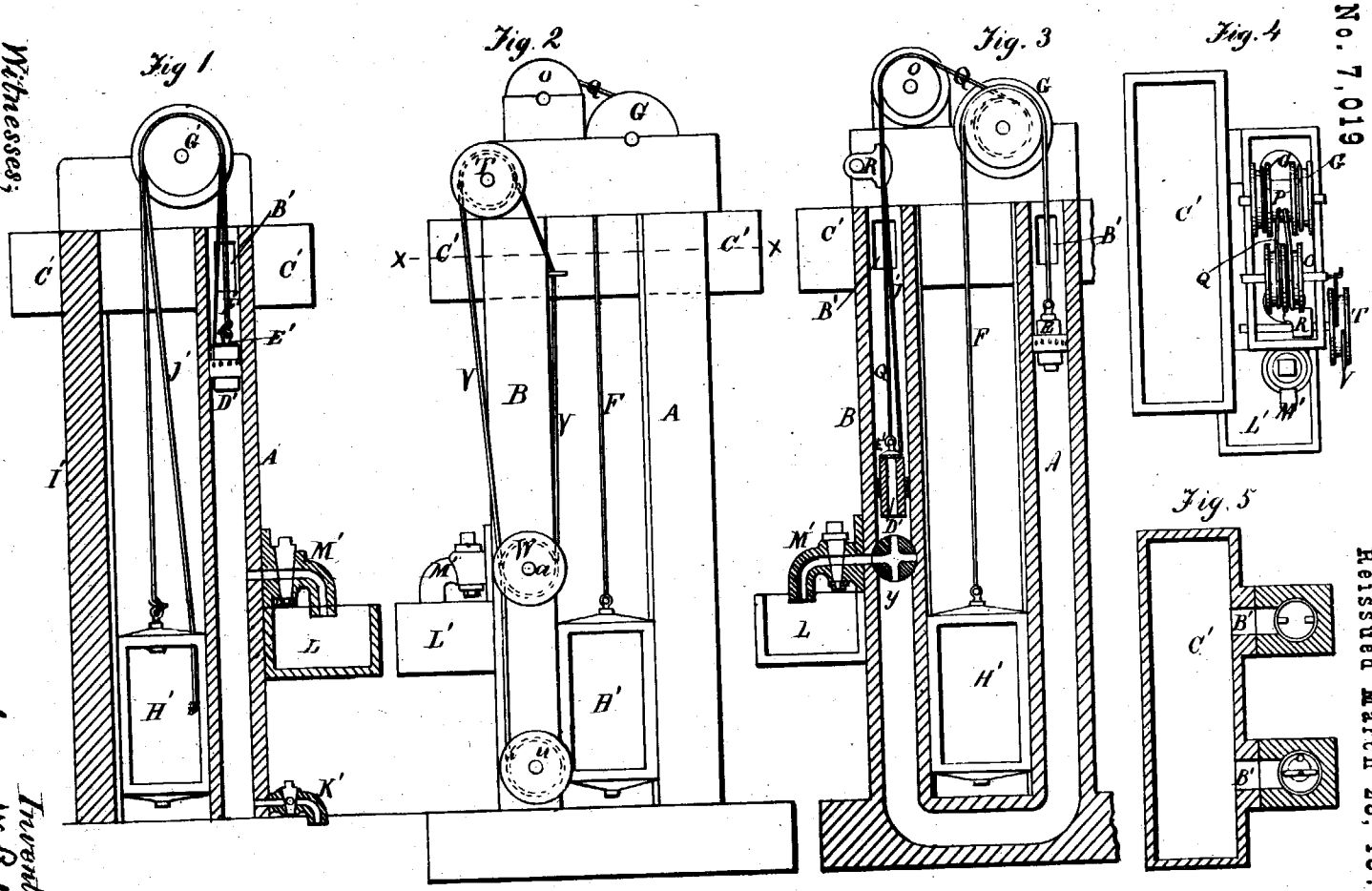
Witnesses;
Grenville Lewis
M. Schenck
Inventor.
Cyrus W. Baldwin
By Hill Tillinghast
His attys.

C. W. BALDWIN.

HYDRAULIC-ELEVATOR.

No. 7,019. Reissued March 28, 1876.

Witnesses;
Grenville Lewis
M. Church

Inventor
Cyrus W. Baldwin
By Hill & Ellsworth
His attys

UNITED STATES PATENT OFFICE.

CYRUS W. BALDWIN, OF CHICAGO, ILLINOIS.

IMPROVEMENT IN HYDRAULIC ELEVATORS.

Specification forming part of Letters Patent No. 162,262, dated April 20, 1875; reissue No. 7,019, dated March 28, 1876; application filed January 26, 1876.

*To all whom it may concern:*

Be it known that I, CYRUS W. BALDWIN, of Chicago, in the county of Cook and State of Illinois, have invented certain new and useful Improvements in Hydraulic Elevators; and I do hereby declare the following to be a full, clear, and exact description of the same, reference being had to the accompanying drawings, forming part of this specification, in which—

Figure 6:
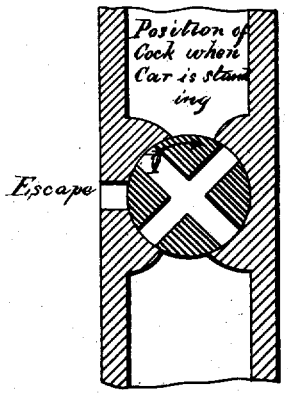
Figure 7:
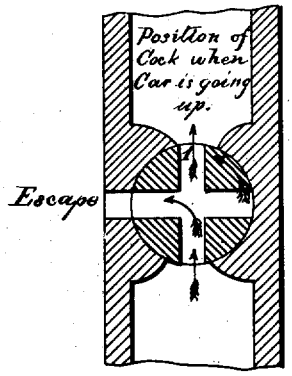
Figure 8:
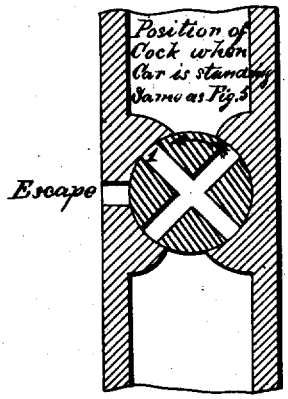
Figure 9:
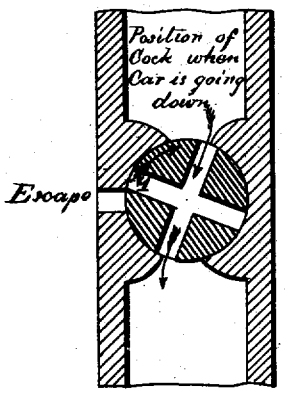
Figure 10:
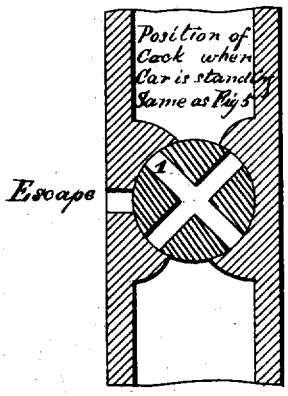

Figure 1 is a vertical section of the elevator with a single tube and piston. Fig. 2 is a side elevation of the elevator, with two cylinders and two pistons. Fig. 3 is a vertical section, taken through the center of Fig. 2. Fig. 4 is a top plan view of the elevator shown in Fig. 2. Fig. 5 is a horizontal section of the same in the line *x x*, Fig. 2. Figs. 6, 7, 8, 9, and 10 are sectional views, showing the various positions of the escape-cock employed with the compound elevator.

Similar letters of reference in the accompanying drawings denote the same parts.

The principal object of my invention is to utilize the force of the water with as little waste as possible; and to this end it consists, first, in raising the elevator-carriage by the the weight, or the pressure and weight, of the water upon the piston, and the normal pressure of the atmosphere above the piston, such forces being applied by drawing the water from the cylinder below the piston. It further consists in graduating the quantity of water expended or discharged to the weight to be lifted. It further consists in the combination, with the stationary elevator-tube and the elevator-carriage, of a piston adapted to travel within the tube with a column of water above and below it. It consists, lastly, in the application of the invention by two upright communicating cylinders, one provided with a water-escape and a graduating-piston, and the other with a lifting-piston, as I will presently describe.

Referring to Fig. 1 of the accompanying drawings, A′ is a single upright cylinder, which, in practice, is supported upon a solid foundation, and extends from the bottom to the top of a building. It communicates through an opening, B′, at its upper end, with a water tank or reservoir, C′, and carries within it a hollow piston, D′, having a flap or hinged valve, E′, at its top, like the box of an ordinary lifting-pump. The piston is suspended from a rope or band, F′, which passes over a pulley, G′, at or near the top cylinder, and is attached to the carriage H′, arranged, in this instance, to move between the cylinder and a guide, I′. The valve E′ is attached to one end of a hand-rope, J′, which also passes over the pulley G′, and has its opposite end secured within the carriage. K′ is a cock or valve, placed at the bottom of the cylinder, of sufficient capacity to discharge the water therefrom as rapidly as may be necessary to obtain the requisite speed of the carriage. L′ is a tank, arranged at the side of the cylinder, about fifty feet above the lowest point reached by the carriage in its descent. Communication between the cylinder and tank is made by an escape-cock, M′, inserted in the side of the cylinder. The weight of the piston should nearly counterbalance the carriage, and when the latter is down the piston is at the highest point in the cylinder, which is normally filled with water above and below the piston.

In order to raise the carriage, the escape-cock M′ is opened by any suitable means to discharge the water from the cylinder beneath the piston into the tank L′, thus causing the piston to descend and the carriage to be raised.

This movement of the piston is due, first, to atmospheric pressure above the piston, caused by the escape of water below; secondly, the gravity of the water directly upon the piston; and, thirdly, the pressure of the water upon the piston, acting as a variable force dependent upon outside circumstances—as, for example, the pressure in the city mains, or the difference in height between the top of the cylinder and the level of the water in the reservoir C′. The atmospheric pressure decreases in force as the column of water beneath the descending piston decreases in height; but its loss is compensated for by the lengthening of the column above the piston.

When the piston, in its descent, reaches about the level of the escape-cock M′, the latter may be shut off and the lower cock K′ opened to admit a further descent of the piston. The water from this latter cock may escape into the sewers, or be raised to the reservoir C′ by suitable means, to be used over again. The water in the tank L′ may also be carried to the reservoir C′ for the same purpose. The carriage is stopped at any point by arresting the flow of water, and as long as there is a supply of water to the cylinder there is no danger whatever of the carriage falling by reason of any displacement or disarrangement of the piston.

When the carriage is to descend the escape-cocks are closed, and the operator pulls upon the cord J′ to open the valve E′, so that the piston shall be moved upward through the water by the weight of the car, the water passing through the piston in proportion to the opening of the valve. This proportion is governed by the load to be carried down. If it is very light, or is only the empty carriage, then the valve may be opened to its fullest extent; but if the load is heavy, then it is opened but a short distance to retard the flow of water through the piston. The carriage is thus allowed to sink noiselessly and smoothly, its speed being also regulated by the operator in opening or closing the valve to a greater or less extent. By this means the piston performs the office of a graduating as well as a lifting piston.

To adapt the principle of the invention for use in hotels, public buildings, and other localities where prolonged duty is required and heavy loads to be raised, two cylinders may be employed instead of one, each containing a piston, one of which is a graduating and the other a lifting piston, as shown in Figs. 2 and 3.

In this modification, A B are the two cylinders, communicating with each other at the bottom, and at the top they are in free communication with the water-supply tank C′ through the openings B′. The main cylinder A contains the lifting-piston E, which is made solid, and the cylinder B contains the graduating-piston D′, constructed as hereinbefore described. The elevator-carriage, in this instance, may move up and down between the cylinders as guides, and is connected with the lifting-piston by cords, wire ropes, or chains F′, passing over pulleys G G at or near the top of the cylinders. The graduating or valve piston is suspended by a rope or cord, Q, passing over pulley O, and made fast to a drum, P, on the axis of the pulleys G, which are rotated by the movement of cords of the lifting-piston. The valve of the graduating-piston is also provided with an operating-cord, J′, which runs over the pulley O and is made fast to a drum, P. The valve-piston, in this instance, travels up and down in its cylinder about three-fourths only of the distance traveled by the lifting-piston, and the drum P is therefore proportionately smaller than the pulleys G. L′ is the receiving-tank, arranged at the side of the graduating-cylinder, and M′ is the water-discharge cock, located in the side of the cylinder about thirty feet below the highest point reached by the lifting-piston in the other cylinder. This distance is, perhaps, the most available; but, while it may be less than thirty feet, it should not much exceed that distance.

To control the escape of water a four-way cock, *y*, is inserted in the discharge-cock M′. Any other device may, however, be employed for this purpose, provided it has the capacity to close the cylinder and discharge-cock at certain times; at other times to close the discharge-cock and open the cylinder; and at still other times to open both the discharge-cock and the cylinder. The discharge-cock has a stem, *a*, extending out through cylinder B, to receive a wheel, W, and to this wheel the valve cord V is made fast, after extending over pulleys T U at the top and bottom of the apparatus, respectively, as shown in Fig. 2. It is made fast to the upper pulley T, and to the axis of this pulley an eccentric, R, is secured, so that its outer end shall bear against or engage the valve-cord J′. A movement of this eccentric in either direction will displace or bend the cord sufficiently to lift the valve E′ of the graduating-piston. There is, however, sufficient play between the eccentric and its cord to allow the valve-cord V to be pulled sufficiently for opening the escape-cocks Y before the piston-valve E′ is operated.

By means of these devices the quantity of water expended is graduated to the weight of the load. Both cylinders are supposed to be filled with water from the reservoir or city mains. When the carriage is down the escape-cock is in the position shown in Fig. 6. If it is desired to raise it loaded to its full carrying capacity, the escape-cock is turned to the right, into the position shown in Fig. 7, and the valve-cord is pulled to open wide the valve E′ of the graduating-piston. The water below the lifting-piston will, under these conditions, pass out through the escape-cock, and the elevator will work at its full power; but if the load is less than the full lifting capacity of the elevator, then the valve is opened proportionately, as already described. In this case as the valve-piston rises there is a constant tendency to a vacuum beneath it, which has the effect of carrying up through and above the escape-cock a portion of the water that would otherwise be discharged. This water is kept in the cylinder when the car stops in its upward ascent, inasmuch as the four-way cock, to arrest the car, is turned to the position shown in Fig. 8. When the car is to descend, the cord is pulled to turn the escape-cock into the position shown in Fig. 9, thus closing the escape and opening the cylinder. This allows the carriage to settle down and the valve-piston to return to its original position just above the escape-cock, the descent of the carriage being arrested by turning the escape-cock into the position shown in Fig. 10. The next upward movement of the valve-piston will have the effect of lifting the body of water above such piston into the supply-tank C′. Thus, in effect, is utilized the surplus power of the elevator to carry back to the supply-tank the water not needed to produce the lifting action.

So far as this graduating action is concerned, it is not necessary that the escape should be located with respect to the lifting-piston, as hereinbefore explained, for the escape from the main cylinder may lead into a tank at the bottom of the apparatus, and from this tank a suction-pipe may lead to the graduating-cylinder.

When the carriage descends, the valve-piston performs the function of decreasing the diameter of its tube or cylinder, making the latter, in effect, a smaller graduating conduit for the passage of the water from above the lifting-piston to the cylinder A below such piston. As the lifting-piston ascends in its cylinder, it necessarily lifts all the water above it into the tank C′, and, as the latter is in connection with the cylinder or tube B, the water passes down through the valve-piston into the cylinder A, to fill the space under the lifting-piston as it moves up. Thus there is a circulation of the water through the cylinders or tubes, the tank forming a part of the conduit therefor.

Having thus described my invention, I claim as new—

1. In a water-elevator, a movable piston, combined with a stationary upright cylinder having a water-supply above and a water-discharge below the piston, for the purpose of raising the elevator-carriage by atmospheric pressure, and the weight, or the combined weight and pressure, of the water above the piston when the water below the piston is discharged, substantially as described.

2. In a water-elevator, an adjustable discharge or escape, combined with one or more upright cylinders, to graduate the quantity of water expended to the weight to be lifted, substantially as described.

3. The combination, with the stationary elevator tube or cylinder and the elevator-carriage, of a piston having a flexible connection with the carriage, and adapted to travel within the tube, with a column of water above and below it, substantially as described, for the purpose specified.

4. The combination of the graduating valve-piston with one or more upright water-cylinders, substantially as described.

5. The combination, with the two communicating upright cylinders, of the lifting-piston in one cylinder, and the water-escape in the other cylinder, located with respect to the lifting-piston, substantially as shown and described.

6. The combination, with the main cylinder and graduating-cylinder, of the lifting-piston, water-escape, and graduating valve-piston, for joint operation, as shown and set forth.

7. The combination, with the graduating-cylinder B, of the escape, the escape-cock Y, and the graduating valve-piston, arranged and operating as shown and set forth.

8. The graduating-piston B and its valve, in combination with the escape-cock, and the valve-cord, and intermediate mechanism, by which said valve and co[illegible] are connected and operated, substantially as set forth.

9. The combination, with the water-supply reservoir, the main cylinder, the lifting-piston, and the elevator-car, of the escape, the escape-cock, the graduating-piston, and its valve, for joint operation, as shown and set forth.

10. In combination with the main and graduating cylinders, elevator-car, and lifting-piston, the graduating-piston, provided with a valve opening upward, and arranged to rise in the graduating-cylinder when the car rises, substantially as shown and set forth.

11. The stationary elevator cylinder or tube containing a traveling piston having a flexible connection with an elevator-carriage, the cylinder being joined by a tube or conduit provided with a valve by which the passage of the water from one side of the piston to the other can be controlled at the will of the operator, substantially as described.

CYRUS W. BALDWIN.

Witnesses:
PHILLIPS ABBOTT,
BARON HIGHAM.